US010507925B2

(12) United States Patent
Pugliesi et al.

(10) Patent No.: US 10,507,925 B2
(45) Date of Patent: Dec. 17, 2019

(54) PASSENGER AIRFLOW CONTROL DEVICES

(71) Applicant: EMBRAER S.A., São José dos Campos—SP (BR)

(72) Inventors: Fernanda Loth Pugliesi, São José dos Campos (BR); Cassio Karassawa Zanoni, São José dos Campos (BR); Bruno Kimura Castanha, São José dos Campos (BR); Jay Beever, São José dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 305 days.

(21) Appl. No.: 15/719,966

(22) Filed: Sep. 29, 2017

(65) Prior Publication Data

US 2019/0100317 A1     Apr. 4, 2019

(51) Int. Cl.
*B64D 13/00* (2006.01)

(52) U.S. Cl.
CPC ........ *B64D 13/00* (2013.01); *B64D 2013/003* (2013.01); *B64D 2203/00* (2013.01)

(58) Field of Classification Search
CPC ...... B64D 2013/003; B64D 2013/0625; B64D 13/00; B34H 1/34; B34H 1/3435; B34H 1/3442
USPC ............ 454/86, 71, 152, 76, 154; 244/118.5
See application file for complete search history.

(56) References Cited

U.S. PATENT DOCUMENTS

| | | | | |
|---|---|---|---|---|
| 1,748,863 A | * | 2/1930 | Burke | B01D 45/06 454/289 |
| 3,319,560 A | * | 5/1967 | Schaaf | B60H 1/3442 454/154 |
| 3,432,142 A | * | 3/1969 | Ludford | B60H 1/3442 251/212 |
| 5,399,119 A | * | 3/1995 | Birk | B60H 1/3442 454/286 |
| 6,610,116 B1 | * | 8/2003 | Avery | B01D 46/10 454/154 |
| 8,539,784 B2 | * | 9/2013 | Heuer | F24F 13/105 454/297 |
| 9,045,235 B2 | * | 6/2015 | Rittner | B64D 47/02 |

(Continued)

*Primary Examiner* — Vivek K Shirsat
(74) *Attorney, Agent, or Firm* — Nixon & Vanderhye P.C.

(57) ABSTRACT

Airflow control devices are provided that may be employed in passenger transport vehicles (e.g., passenger transport aircraft, trains, buses, automobiles and the like) that allow individual passengers to selectively control direction and volume of incoming airflow to thereby enhance passenger comfort. According to certain embodiments, passenger airflow control devices are provided with an open-ended domed shell, a receiver immovably fixed to an upper end of the shell and a central air distributor assembly operatively connected to the receiver for receiving an incoming airflow and discharging the airflow to a passenger. The central air distributor assembly may include a central distributor bowl which defines a laterally oriented airflow discharge opening, a central disk which is positionally fixed to and closes a lower end of the central distributor bowl, and an air distributor hub having a lower end immovably connected to an upper end of the central distributor bowl and an upper stem having an air inlet cutout which is received within and rotatably connected to the receiver.

12 Claims, 13 Drawing Sheets

(56) References Cited

U.S. PATENT DOCUMENTS

| | | | | |
|---|---|---|---|---|
| 2006/0116063 A1* | 6/2006 | Seume | ............... | B60H 1/3442 |
| | | | | 454/76 |
| 2008/0112155 A1* | 5/2008 | Scown | ............... | B60H 1/3442 |
| | | | | 362/96 |
| 2010/0093267 A1* | 4/2010 | Hogh | ............... | B60H 1/34 |
| | | | | 454/76 |
| 2013/0203332 A1* | 8/2013 | Fernandes | ............... | B64D 13/00 |
| | | | | 454/76 |
| 2013/0210333 A1* | 8/2013 | Kober | ............... | B60H 1/3442 |
| | | | | 454/154 |
| 2015/0090839 A1* | 4/2015 | Freund | ............... | B64D 11/0015 |
| | | | | 244/118.5 |
| 2015/0336445 A1* | 11/2015 | Uehara | ............... | B60H 1/3442 |
| | | | | 454/155 |
| 2016/0031293 A1* | 2/2016 | Brinas | ............... | B60H 1/34 |
| | | | | 454/152 |
| 2017/0089471 A1* | 3/2017 | Lucas | ............... | B64D 13/00 |
| 2017/0267357 A1* | 9/2017 | Beaudin | ............... | B64D 13/00 |
| 2017/0326951 A1* | 11/2017 | Frenzel | ............... | B60H 1/3435 |
| 2019/0054804 A1* | 2/2019 | Fidh | ............... | B60H 1/3435 |

\* cited by examiner

PASSENGER AIRFLOW CONTROL DEVICES

FIELD

The embodiments disclosed herein relate generally to devices that may usefully be employed in the interior of passenger transport vehicles which allow a passenger to adjust incoming airflow as may be needed to enhance comfort.

BACKGROUND

The interior of transport vehicles (e.g., passenger transport aircraft, trains, buses, automobiles and the like) are conventionally provided with an airflow outlet that a passenger can manually manipulated so as to achieve a desired influx of airflow for comfort. Conventional airflow outlets allow the passenger to selectively adjust the direction and/or volume of airflow by means of a variety of designs including, for example, adjustable horizontal/vertical vanes, adjustable louvers and/or valve outlets. In transport aircraft, such conventional airflow outlets employed in an overhead passenger service units (PSU) tend to protrude downwardly which adversely affects the aesthetics of the interior cabin.

What has been needed in the art, therefore are passenger airflow devices which may be aesthetically pleasing visually while still providing adjustable airflow capabilities to allow for passenger control. It is towards providing such devices that the embodiments disclosed herein are directed.

SUMMARY

In general, the embodiments disclosed herein relate to airflow control devices that may be employed in passenger transport vehicles (e.g., passenger transport aircraft, trains, buses, automobiles and the like) that allow individual passengers to selectively control direction and volume of incoming airflow to thereby enhance passenger comfort. According to certain embodiment, passenger airflow control devices are provided with an open-ended domed shell, a receiver immovably fixed to an upper end of the shell and a central air distributor assembly operatively connected to the receiver for receiving an incoming airflow and discharging the airflow to a passenger.

The central air distributor assembly according to some embodiments disclosed herein may include a central distributor bowl which defines a laterally oriented airflow discharge opening, a central disk which is positionally fixed to and closes a lower end of the central distributor bowl, and an air distributor hub having a lower end immovably connected to an upper end of the central distributor bowl and an upper stem which is received within and rotatably connected to the receiver. The air distributor hub may define an interior space in fluid communication with the air discharge opening of the central distributor bowl. An air inlet cutout which is capable of fluid communication with the incoming airflow may be defined by the upper stem. Rotational movement of the central air distributor assembly will therefore responsively move the air inlet cutout of the air distributor hub relative to the incoming airflow between open and closed conditions and also concurrently move the discharge opening of the central distributor bowl to allow directional control of the airflow discharged therefrom.

The central disk of the central air distributor assembly may be substantially coplanar with or slightly upwardly recessed relative to a lower circumferential edge of the shell. An annular space may also be defined between a perimetrical edge of the central disk and the lower circumferential edge of the shell so as to allow a passenger to apply finger pressure to the disk in order to effect rotation of the central air distributor assembly.

According to some embodiments, the shell may be formed of a transparent or translucent plastics material. In order to enhance visibility of the central disk, the shell may be illuminated, e.g., by providing a light emitting diode (LED) internally of the PSU in which the airflow control device is provided.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
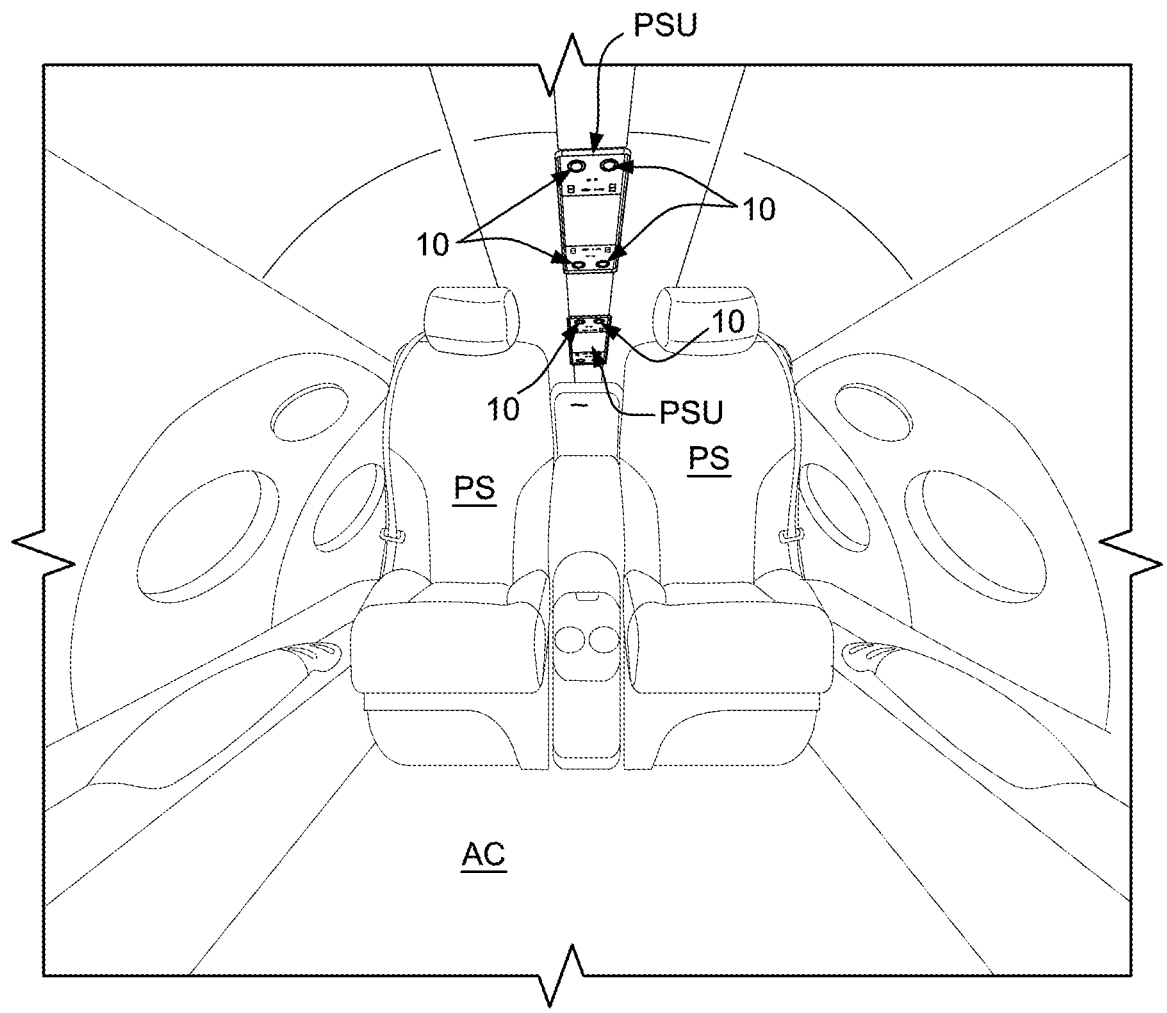
FIG. 1 is a perspective view of an interior aircraft passenger cabin showing an embodiment of the airflow control devices employed in an exemplary overhead PSU.
Figure 2:
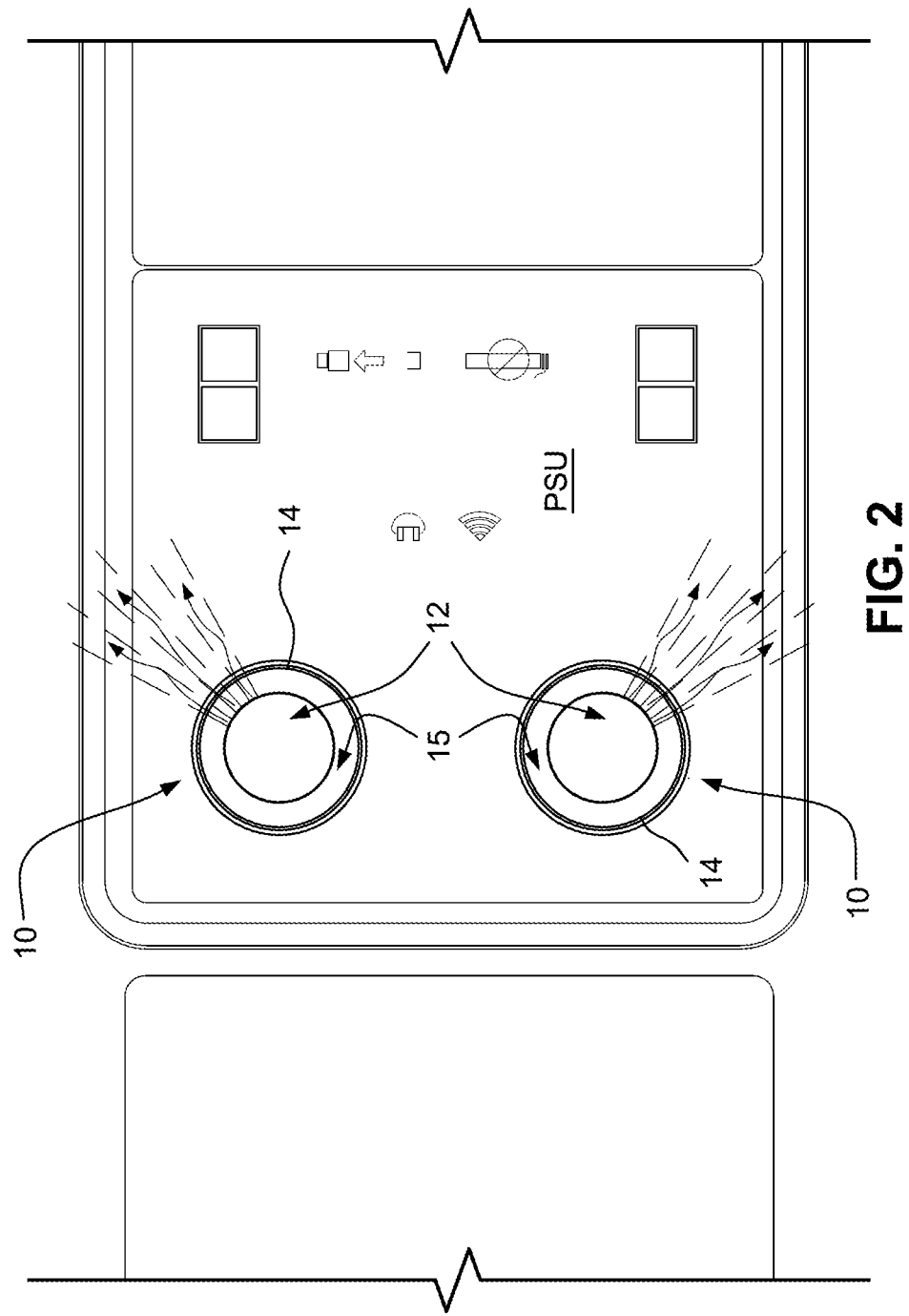
FIG. 2 is a plan view from below of the overhead PSU shown in FIG. 1 provided with the airflow control devices according to an embodiment of the invention.

Accompanying FIGS. 1-4 depict an exemplary interior aircraft cabin AC provided with passenger seats PS that are associated with overhead passenger service unit (PSU) provided with airflow control devices 10 in accordance with an embodiment of the present invention. It will of course be recognized that the depiction and description of the airflow control devices 10 being employed in an interior aircraft cabin AC is only one example of the type of passenger transport vehicles which can usefully benefit from the embodiments disclosed herein. Thus, the although the following description and accompanying drawings are presented in the context of the airflow control devices 10 being usefully employed in the context of a PSU associated with an interior aircraft cabin AC, it will be understood that such description and depiction is an exemplary non-limiting embodiment of the invention.

In the embodiments depicted, the airflow control devices 10 are flush-mounted relative to the PSU. That is, the airflow control devices 10 do not protrude beyond the plane of the PSU but may still be grasped and manipulated by a passenger to control the direction and/or volume of airflow discharged therefrom (see FIG. 3). Specifically, as will be explained in greater detail below, even though the airflow control devices 10 are flush-mounted relative to the PSU, the passenger may rotate the devices 10 so as to effect a change in direction and/or volume of airflow discharged therefrom as may be needed to enhance passenger comfort.

As is depicted in greater detail in the enlarged views of FIGS. 5-10, the exemplary airflow control device 10 generally is comprised of a central air distributor assembly 12 which is positioned within a surrounding open-ended domed shell 14. The shell 14 includes an exteriorly threaded base portion 14a which is which threadably accepts a mounting ring 16 so as to mount the shell 10, and hence the airflow control device 10, to the PSU supporting structure (see FIG. 6).

Figure 3:
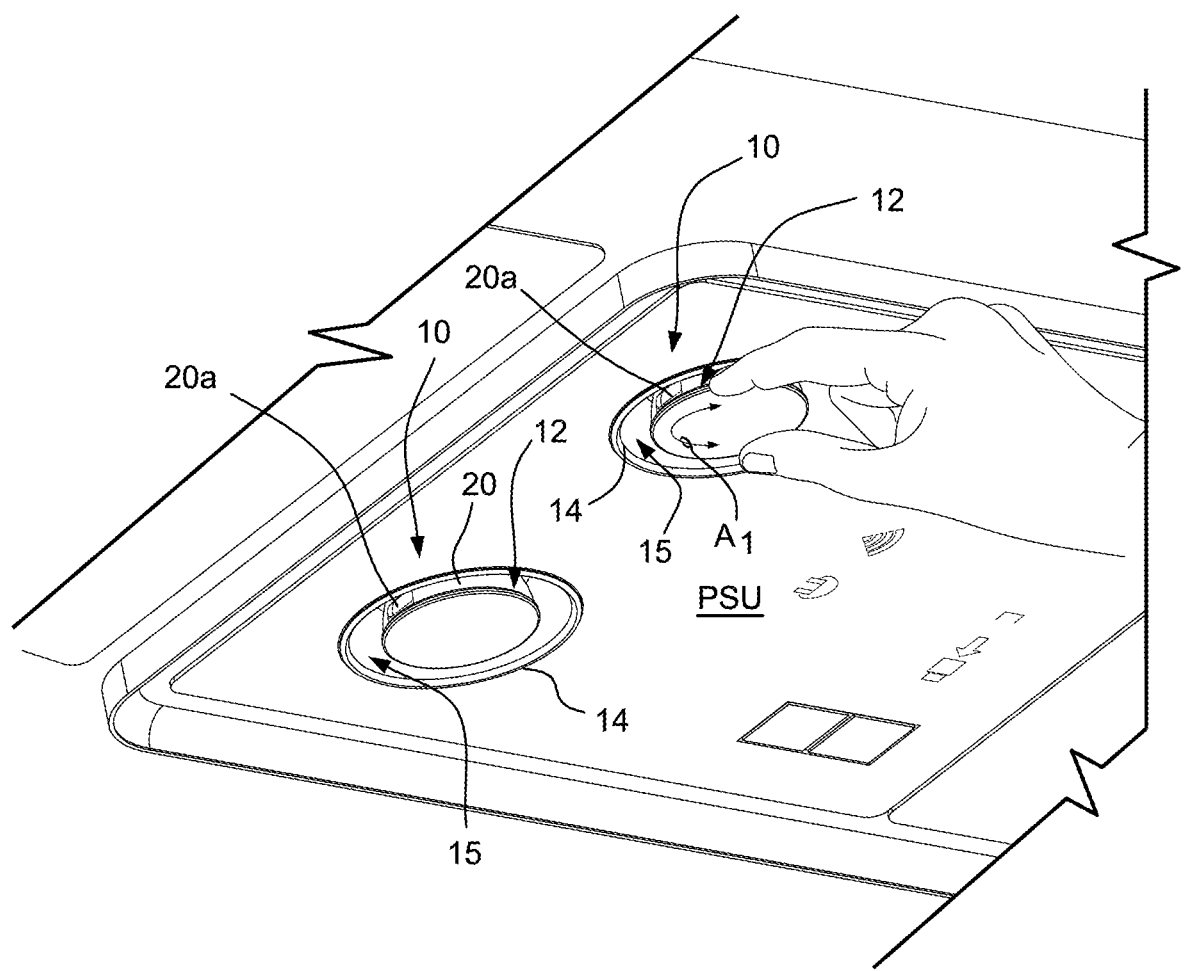
FIG. 3 is perspective view of the overhead PSU shown in FIG. 2.
Figure 4:
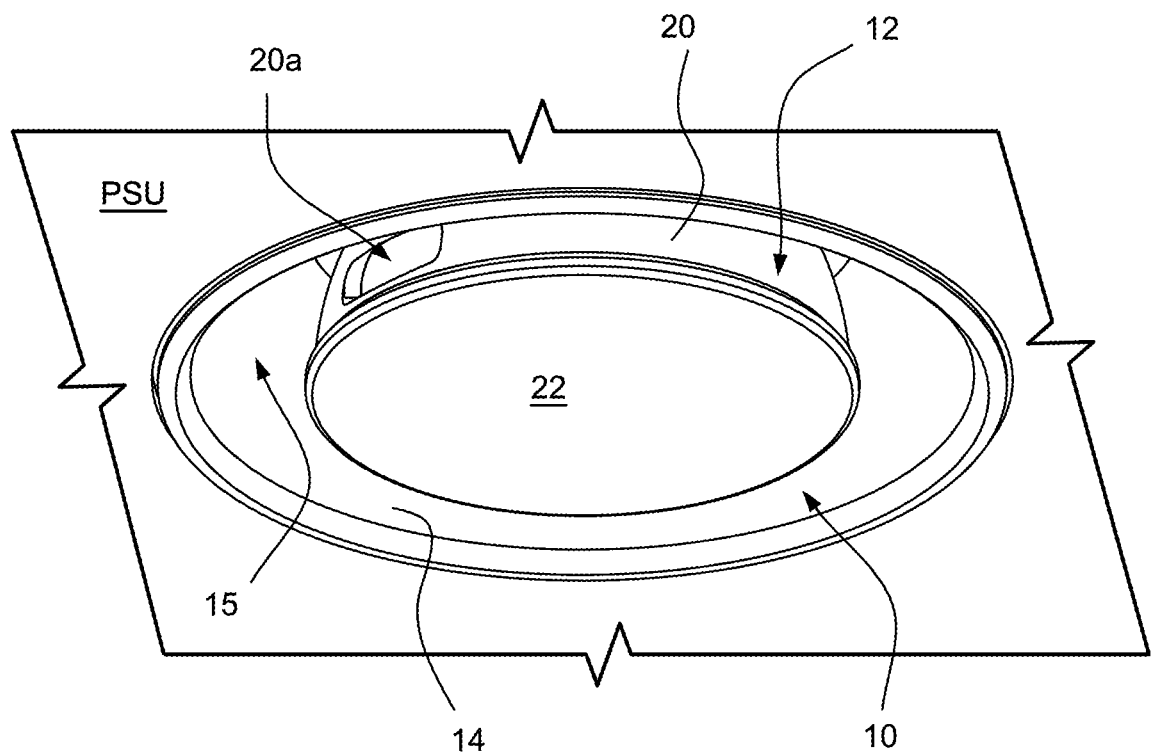
FIG. 4 is a detailed perspective view from below of the airflow control device employed in the PSU of FIGS. 1-3.
Figure 5:
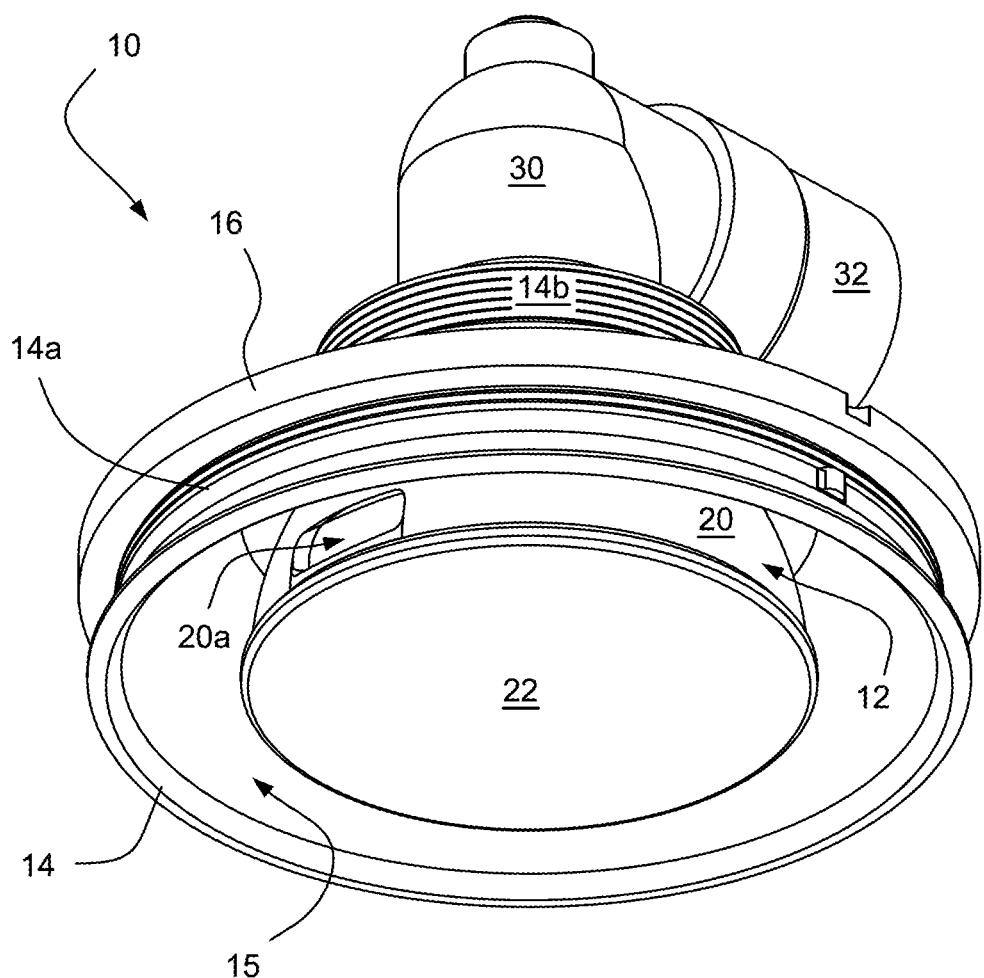
FIG. 5 is an enlarged perspective view from below of the airflow control device in accordance with an embodiment of this invention showing the associated mounting structures and air supply conduits.
Figure 6:
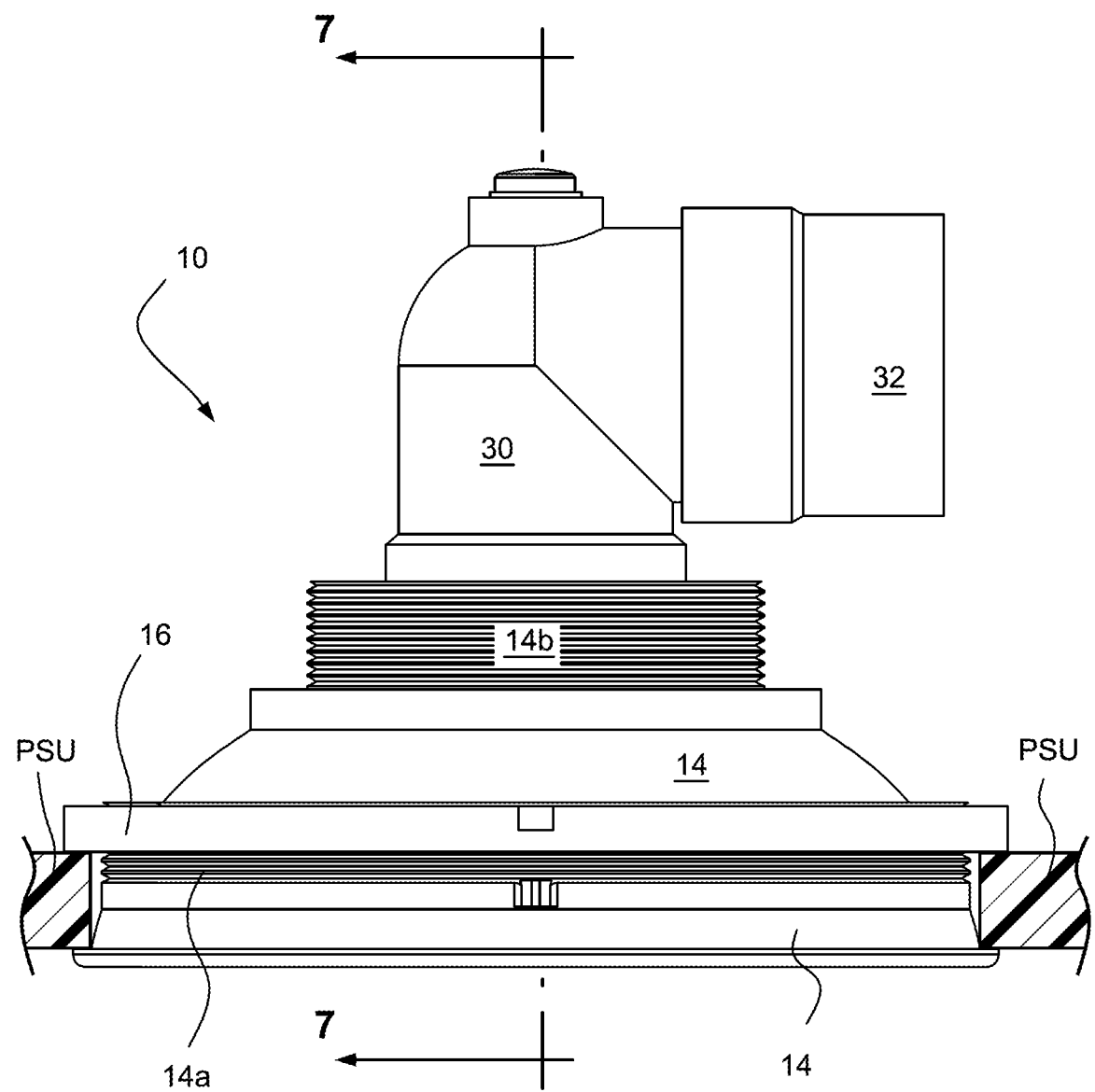
FIG. 6 is a side elevational view of the airflow control device depicted n FIG. 5.
Figure 7:
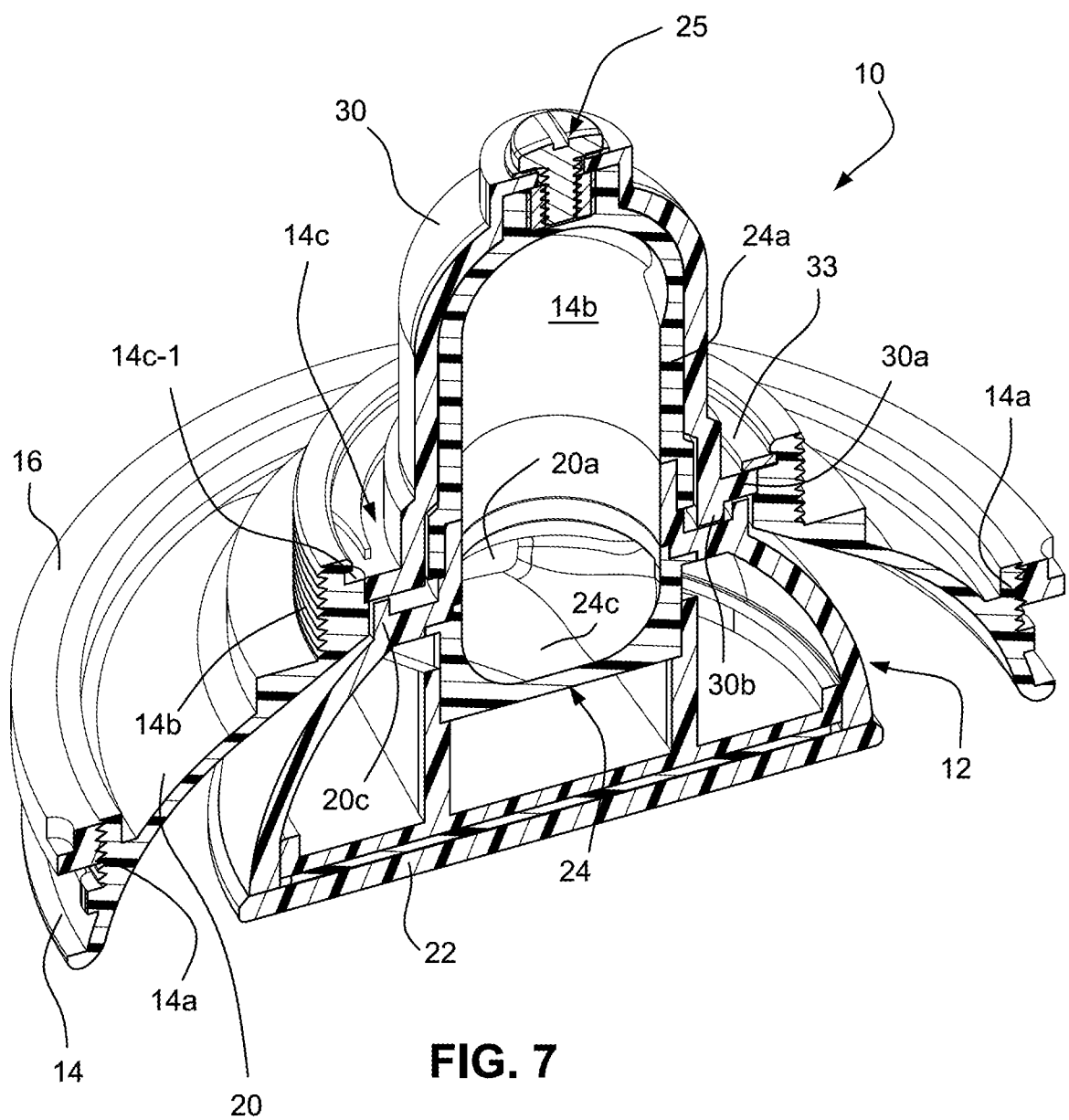
FIG. 7 is a cross-sectional view of the airflow control device as taken along lines 7-7 in FIG. 6.
Figure 8:
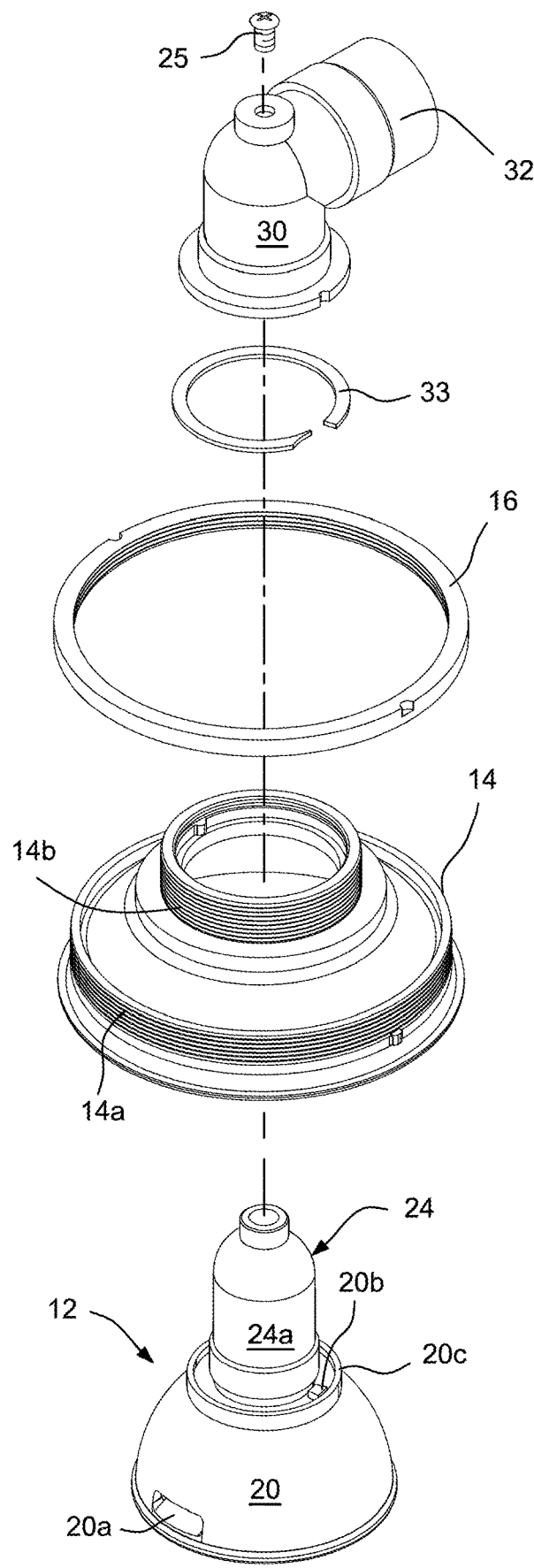
FIG. 8 is an exploded perspective view of the airflow control device depicted in FIG. 5.
Figure 9A:
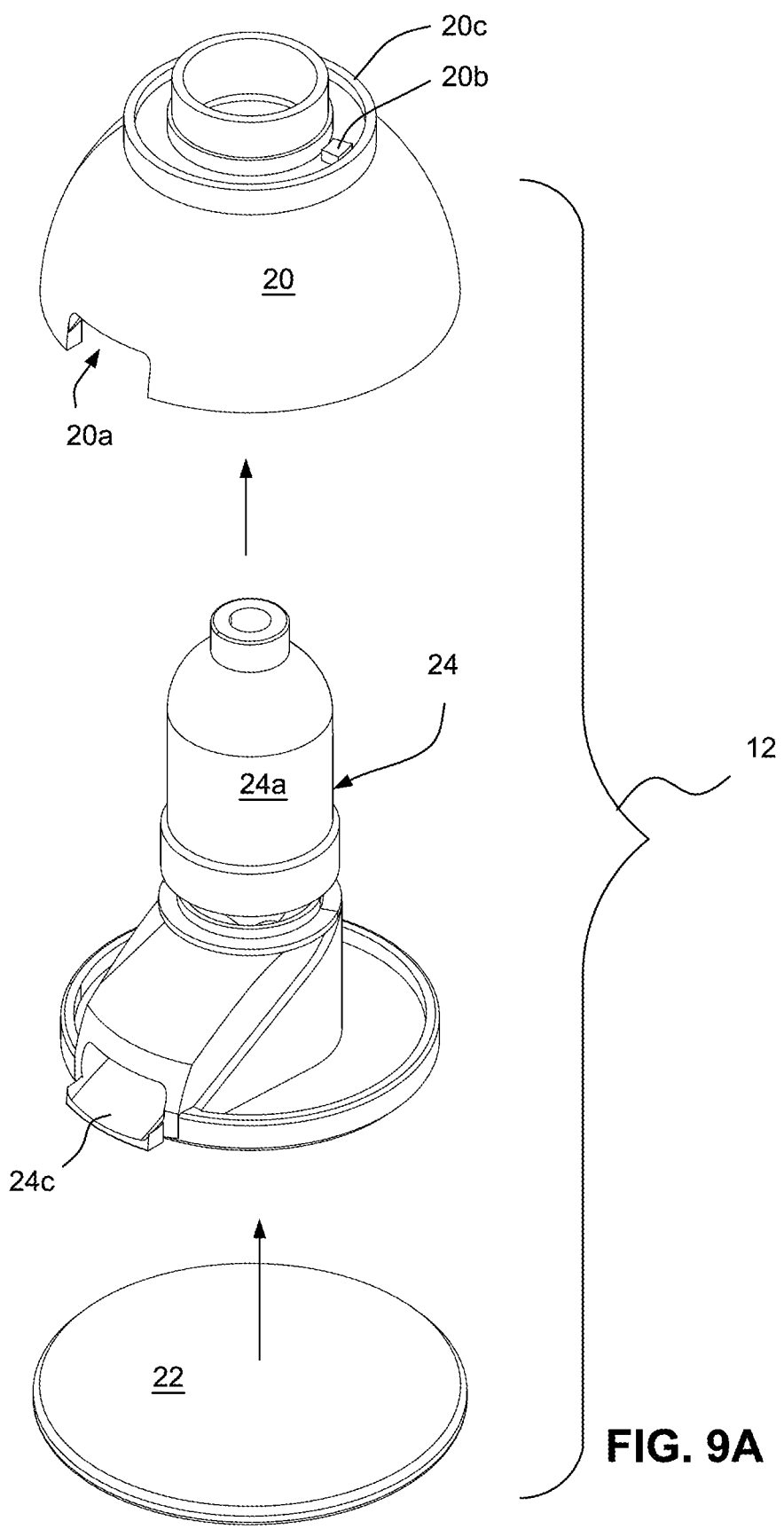
FIGS. 9A and 9B are exploded perspective views of the central air distributor assembly as shown in front and rear orientations thereof, respectively.
Figure 9B:
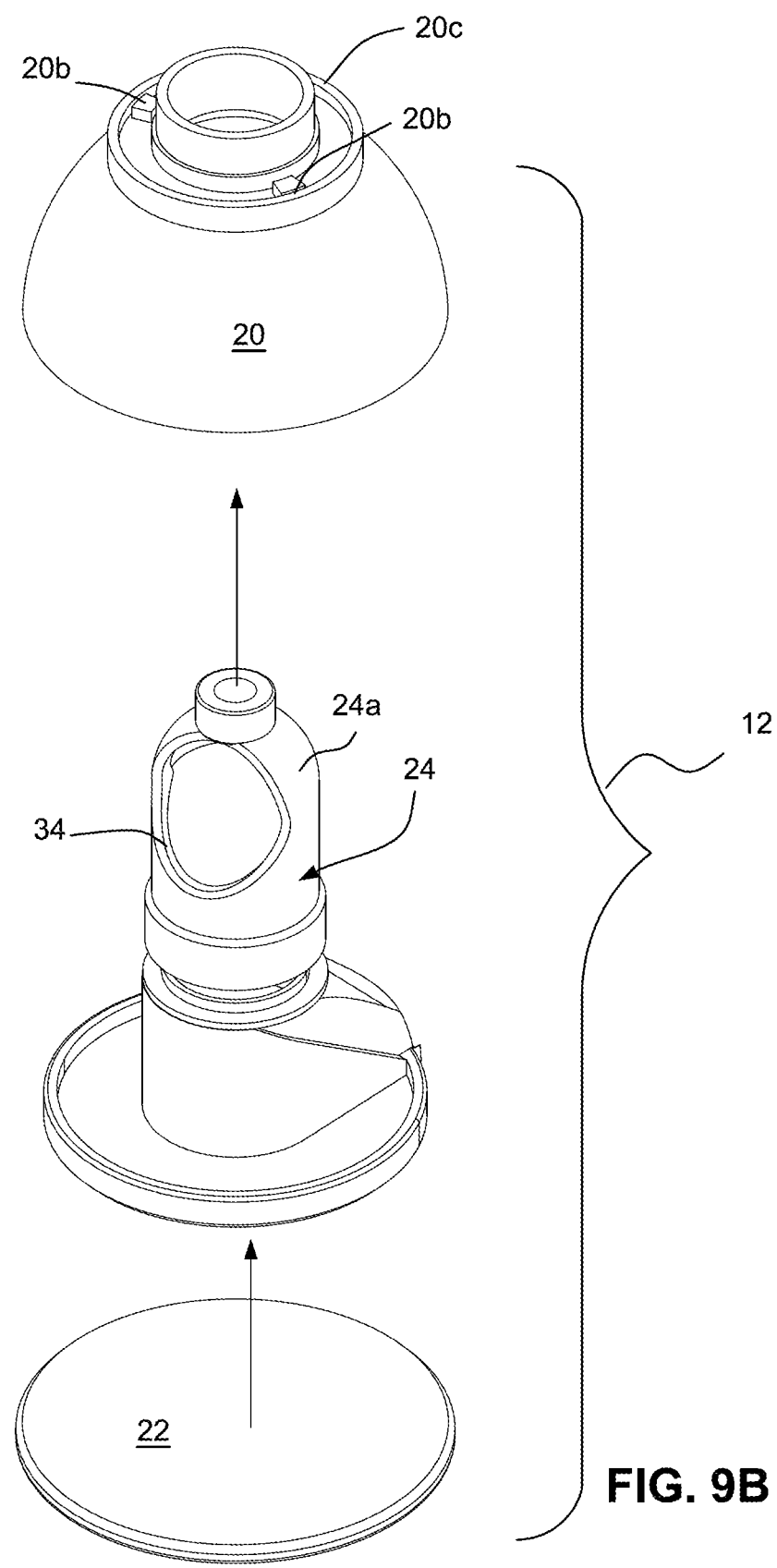
Figure 10:
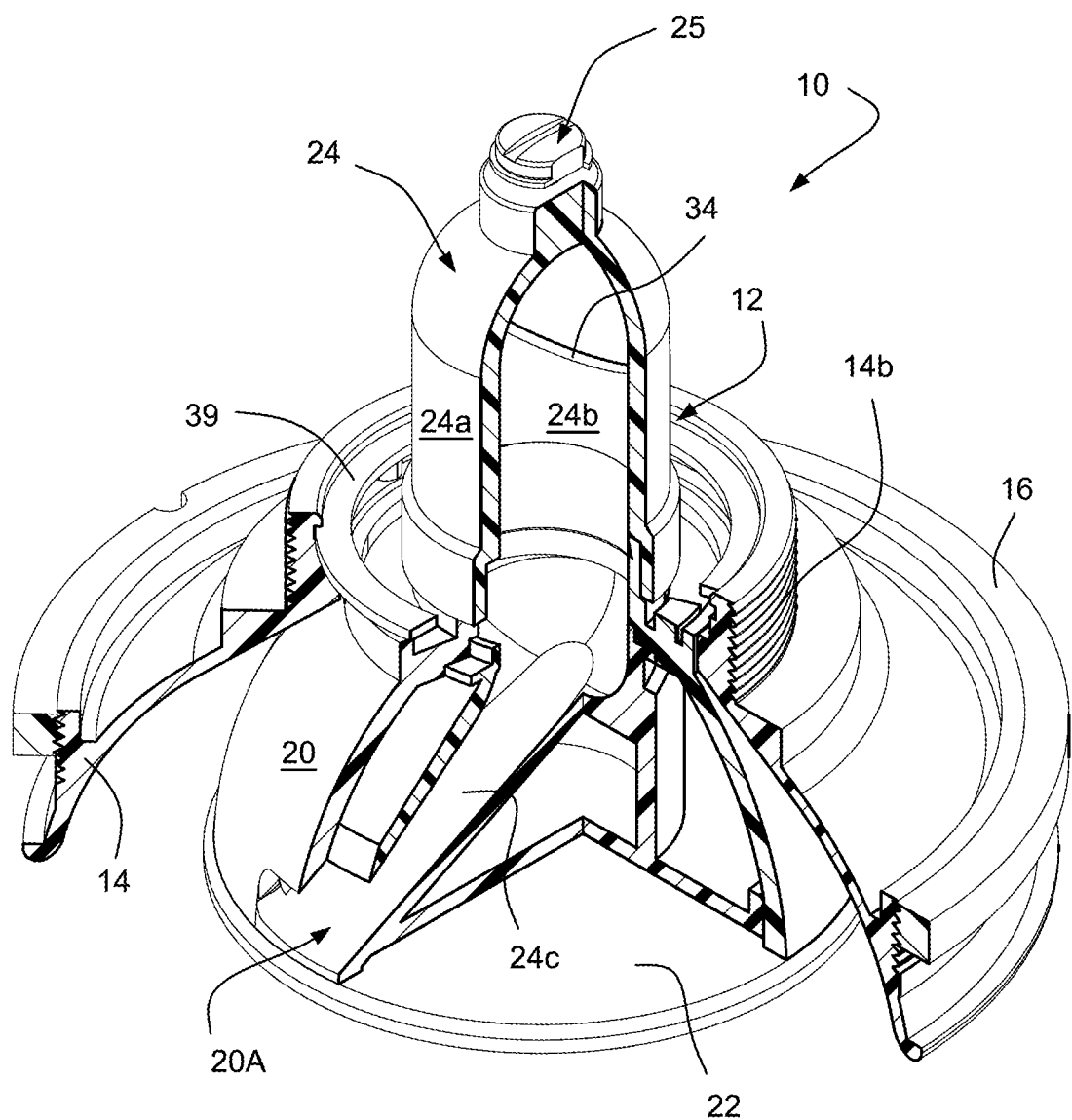
FIG. 10 is a perspective view, partly in section, showing the internal air distributor assembly in relationship to the surrounding domed shell employed in the airflow control device.
Figure 11A:
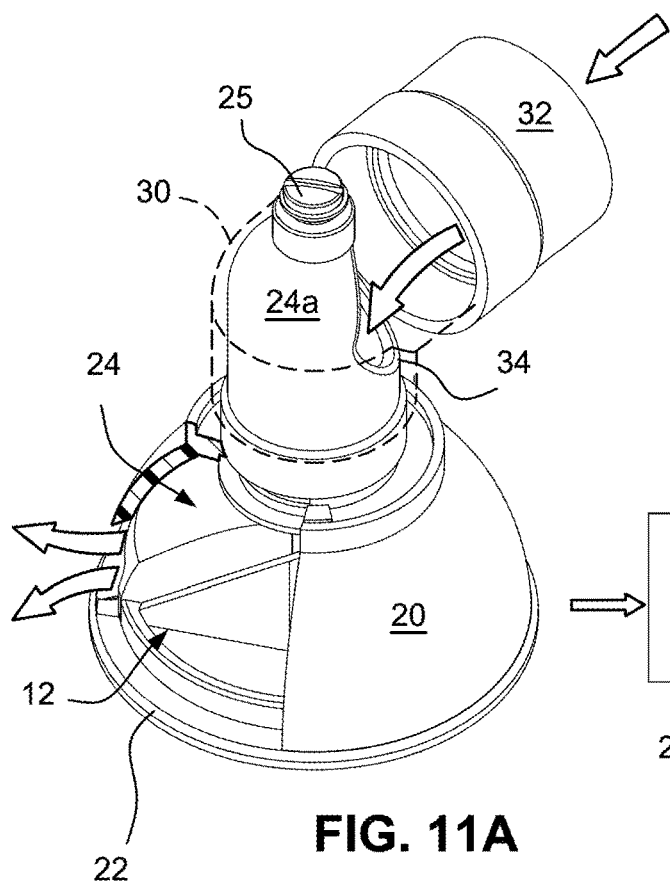
FIGS. 11A-11B and 12A-12B are perspective and partly sectioned top plan views showing different operational orientations of the central air distributor assembly relative to the incoming airflow, respectively.
Figure 11B:
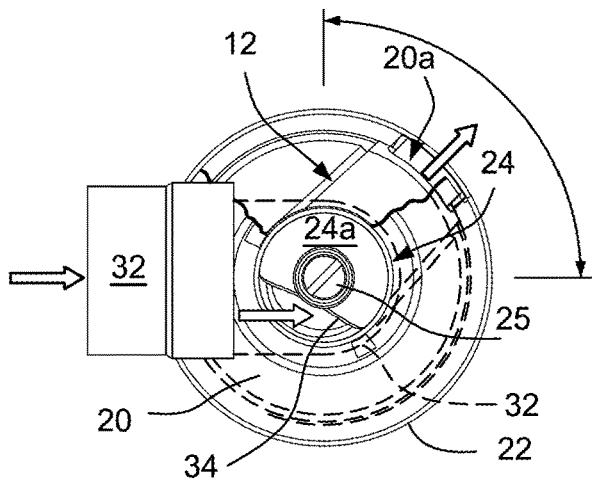
Figure 12A:
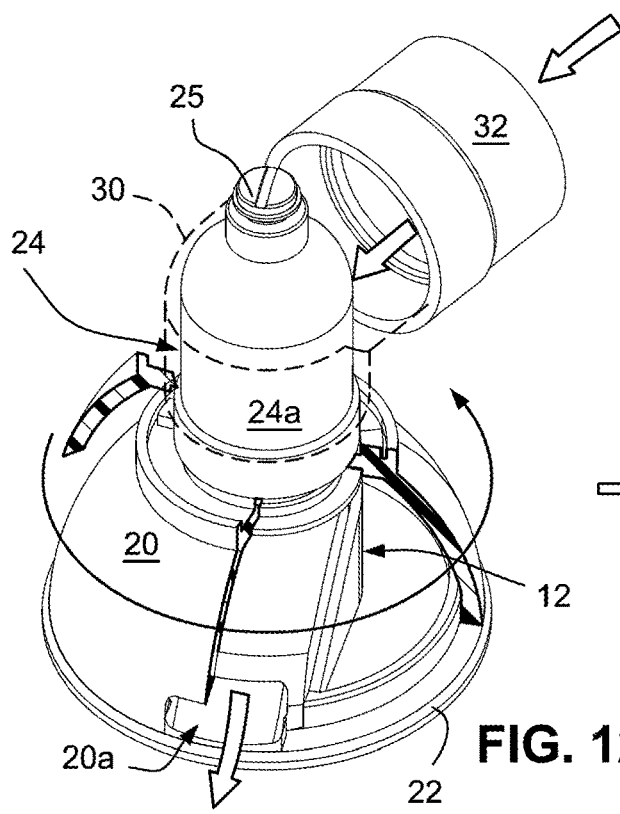
Figure 12B:
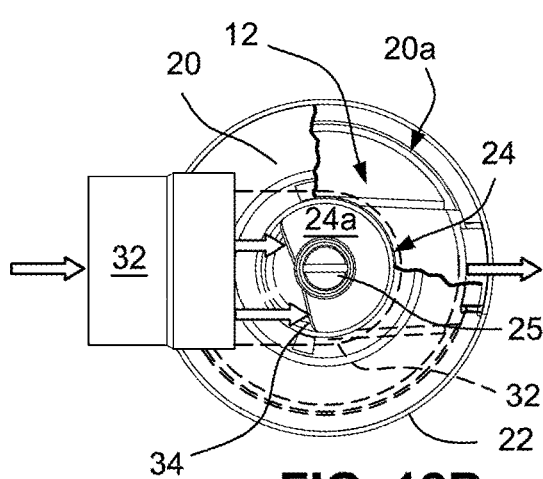

The diameter of the lower circumferential edge of shell 14 is sufficiently large so as to surround the central air distributor assembly 12 and to define an annular space 15 therebetween to allow a passenger to apply finger pressure to the central distributor assembly 12 in order to effect rotation thereof and thereby control the direction of discharged airflow (see FIG. 3). The shell 14 is also preferably formed of a transparent or translucent plastics material that may be illuminated by a light emitting diode (LED) (not shown) positioned within the PSU. In such a manner, therefore, the shell 14 serves as a visible light diffuser to thereby provide indirect illumination for the central air distributor assembly 12, and especially the disk 22 thereof.

The central air distributor assembly 12 is generally comprised of a central distributor bowl 20 having a laterally oriented air discharge opening 20a. The lower end of the distributor bowl 20 is closed by an integrally connected central disk 22. The circumferential edge of the central disk 22 may be knurled and/or may be slightly larger diameter as compared to the diameter of the lower edge of the air distributor bowl 20 to which the disk is attached to thereby provide an enhanced tactile sensation when the passenger manually manipulates the assembly 12 by applying finger pressure to the circumferential edge of the disk 22. As is shown, the central disk 22 is at least substantially coplanar with, or even slightly upwardly recessed relative to, the lower annular circumferential edge of the shell 14 so as to present a pleasing aesthetic appearance to the device 10 in the PSU.

The central distributor bowl 20 is also integrally connected to a lower end of an air distributor hub 24 which includes an upwardly extending stem 24a defining an interior space 24b which is in fluid communication with the opening 20a of the distributor bowl 20. The upper end of the stem 24a is rotatably connected to a receiver 30 by means of a conventional fastener 25. The receiver 30 is in turn fluid-connected to an inlet air supply conduit 32 associated with the environmental control system (not show) for the aircraft cabin AC. The lower end of the receiver 30 includes an annular flange 30a which is positioned in the annular recess 14c defined by the upper annular boss 14b of the shell 14. An outer edge of a split-ring retainer 33 is positioned in an interior annular slot 14c-1 formed in the annular recess 14c of the upper boss 14b so as immovably fix the flange 30a of the receiver 30 to the shell 14. The hub 24 includes a downwardly inclined and laterally oriented air deflection surface 24c which serves to redirect the air entering the interior space 24b from the air inlet conduit 32 toward the opening 20a and thereby provide an airflow direction which is downwardly and laterally oriented below the lower edge of the shell 14. In such a manner airflow impingement against the interior surface of the shell 14 will thus be minimized while the downward and lateral directional airflow exiting the opening 20a will be maximized.

The stem 24a is therefore capable of being rotated about its elongate axis to allow reciprocal rotational movements of the central air distributor assembly 12 relative to the receiver 30 and relative to the shell 14 to which the receiver 30 is immovably attached (i.e., in the directions of arrow A1 in FIG. 3). The connection between the stem 24a and receiver 30 provided by fastener 25 may also be such that slight tiling of the central distributor assembly 12 relative to horizontal may occur to promote additional direction control over the airflow discharged from the air discharge opening 20a of the central distributor bowl 20 (e.g., by providing a conventional friction-fit ball and socket arrangement as part of the fastener 25).

Figure 13:
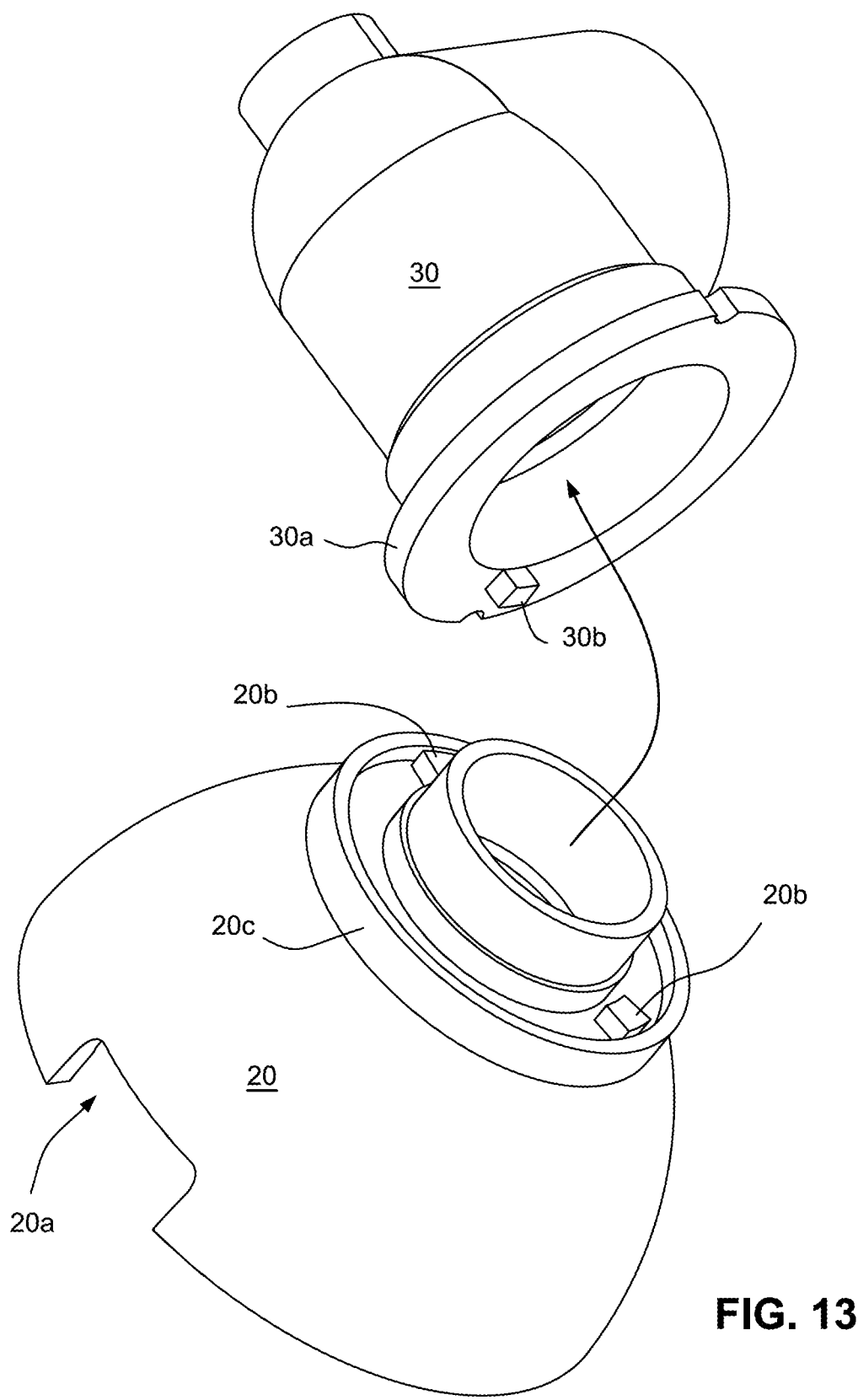
FIG. 13 is an exploded perspective view showing the operative interconnection between the upper annular collar of the air distributor bowl and the flange of the receiver.

As is perhaps more clearly shown in FIGS. 11A-11B and 12A-12B, the upper end of the stem 24a defines an air inlet cutout 34 which is capable of being moved relative to the air inlet conduit 32 between open and closed conditions (i.e., a condition where the substantially entire area of the inlet cutout 34 is presented to the incoming airflow provided by the air inlet cutout 32 and a condition where stem 24a substantially blocks the incoming airflow provided by the air inlet cutout 34). In the embodiment disclosed, the range of substantially fully open condition whereby substantially the entire area of the cutout 34 is exposed to the incoming airflow through the conduit 30 occurs throughout a rotational arc of the central air distributor assembly of about 90° with the remaining rotational orientation beyond such arc being between a modulated open condition (i.e., where at least some area of the cutout 34 is exposed to the incoming airflow through the conduit 30) to a fully closed condition. The orientation of the opening 20a is thereby provided to allow directional airflow control throughout such rotational movement of the air distributor assembly 12 as well as airflow volume control. The operational rotational limits of rotation of the assembly 12 is provided by a stop boss 30b extending downwardly from the flange 30a of the receiver 30 and a diametrically opposed pair of detents 20b provided at the upper annular collar 20c of the air distributor bowl (see FIG. 13). A light emitting diode (LED) (not shown) may be placed within the interior space 24b of the air distributor hub 24 so as to illuminate the opening 20a and thereby provide a visual indication of the orientation of the opening 20a (and hence the directional discharge of airflow therefrom) relative to the passenger.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A passenger airflow control device comprising:
   an open-ended domed shell;
   a receiver immovably fixed to an upper end of the shell;
   a central air distributor assembly operatively connected to the receiver for receiving an incoming airflow and discharging the airflow to a passenger, wherein the central air distributor assembly includes:
   (i) a central distributor bowl which defines a laterally oriented airflow discharge opening;
   (ii) a central disk which is positionally fixed to and closes a lower end of the central distributor bowl; and
   (iii) an air distributor hub having a lower end immovably connected to an upper end of the central distributor bowl and an upper stem which is received within and rotatably connected to the receiver, wherein
   (iii) the air distributor hub defines an interior space in fluid communication with the air discharge opening of the central distributor bowl and includes an air inlet cutout which is capable of fluid communication with the incoming airflow, wherein rotational movement of the central air distributor assembly responsively moves the air inlet cutout of the air distributor hub relative to the incoming airflow between open and closed conditions and concurrently moves the discharge opening of the central distributor bowl to allow directional control of the airflow discharged therefrom.

2. The device as in claim 1, wherein the central disk is substantially coplanar with a lower circumferential edge of the shell.

3. The device as in claim 2, further comprising an annular space defined between a perimetrical edge of the central disk and the lower circumferential edge of the shell.

4. The device as in claim 3, wherein the shell is formed of a transparent or translucent plastics material.

5. The device as in claim 1, wherein the air distributor hub includes a downwardly inclined and laterally oriented air deflection surface to redirect the air entering the interior space toward the air discharge opening and thereby provide an airflow direction which is downwardly and laterally oriented below a lower circumferential edge of the shell.

6. The device of claim 1, wherein
   the shell includes an upper annular boss which defines an annular upper recess, and wherein
   the receiver includes a lower flange which is received within the annular recess and positionally fixed therein to the upper annular boss of the shell.

7. The device of claim 6, wherein the upper annular boss includes an annular slot, and wherein the device further comprises a split-ring retainer received within the annular slot to positionally fix the lower flange of the receiver within the upper annular boss of the shell.

8. The device of claim 1, which further comprises limit stops to limit an extent of rotational movement between the central air distributor assembly and the receiver.

9. The device of claim 8, wherein the limit stops comprise a stop boss associated with the receiver and a pair of circumferentially separated detents associated with the air distributor bowl.

10. The device of claim 9, wherein the detents are diametrically opposed relative to one another.

11. An overhead passenger service unit which comprises at least one passenger airflow device as in claim 1.

12. An interior aircraft cabin which includes passenger seats and an overhead passenger service unit (PSU) associated with the passenger seats, wherein the PSU comprises at least one passenger airflow device as in claim 1.

* * * * *